United States Patent
Kunreuther et al.

(10) Patent No.: US 9,149,934 B2
(45) Date of Patent: Oct. 6, 2015

(54) CONNECTOR FOR MULTIPLE POTTED PLANTS

(71) Applicant: Aftex Industries, Franklin Square, NY (US)

(72) Inventors: Steven Kunreuther, New York, NY (US); Andrew Franzone, Jr., West Islip, NY (US)

(73) Assignee: AFTEX INDUSTRIES, Franklin Square, NY (US)

( * ) Notice: Subject to any disclaimer, the term of this patent is extended or adjusted under 35 U.S.C. 154(b) by 0 days.

(21) Appl. No.: 14/516,002

(22) Filed: Oct. 16, 2014

(65) Prior Publication Data

US 2015/0108778 A1   Apr. 23, 2015

Related U.S. Application Data

(60) Provisional application No. 61/894,808, filed on Oct. 23, 2013.

(51) Int. Cl.
*B25J 1/04* (2006.01)
*B25J 15/00* (2006.01)
*A01G 9/08* (2006.01)

(52) U.S. Cl.
CPC ............. *B25J 15/0052* (2013.01); *B25J 1/04* (2013.01); *A01G 9/088* (2013.01)

(58) Field of Classification Search
CPC ............ A01G 9/088; A45F 5/10; B25J 1/04; B25J 15/0052
USPC .................... 294/15, 27.1, 33, 145, 159, 162, 294/165–169
See application file for complete search history.

(56) References Cited

U.S. PATENT DOCUMENTS

| 193,479 | A | * | 7/1877 | Burgin | 294/67.1 |
|---|---|---|---|---|---|
| 912,472 | A | * | 2/1909 | Hart | 294/33 |
| 1,472,461 | A | * | 10/1923 | Comstock | 294/27.1 |
| 2,661,879 | A | * | 12/1953 | Lee et al. | 294/162 |
| 2,782,916 | A | * | 2/1957 | Goenen | 206/145 |
| 2,998,174 | A | * | 8/1961 | Weder et al. | 294/164 |
| 3,209,870 | A | * | 10/1965 | Johns | 206/315.1 |
| D314,731 | S | * | 2/1991 | Ryason et al. | D11/148 |
| D404,919 | S | * | 2/1999 | McCorkle, Jr. | D3/315 |
| 2012/0019017 | A1 | * | 1/2012 | Leptien | 294/175 |

* cited by examiner

*Primary Examiner* — Dean Kramer
(74) *Attorney, Agent, or Firm* — Epstein Drangel LLP; Robert L. Epstein

(57) ABSTRACT

The connector includes a base and at least two pot engaging parts extending from the base. Each of the engaging parts has a surface adapted to face the wall of a pot, a first engaging member extending in a plane substantially parallel to, but spaced from, the engaging part surface, and two second engaging members extending in a direction opposite to the direction of the first part. The second engaging members are spaced from the first engaging member such that the wall of a pot may be situated between the first engaging member, on the one hand, and the two second engaging members, on the other hand. The second engaging members each have a pot wall contact portion. The contact portion of each of the second engaging members is inclined toward the first engaging member and away from the engaging part surface to accommodate the curvature of a pot wall.

21 Claims, 6 Drawing Sheets

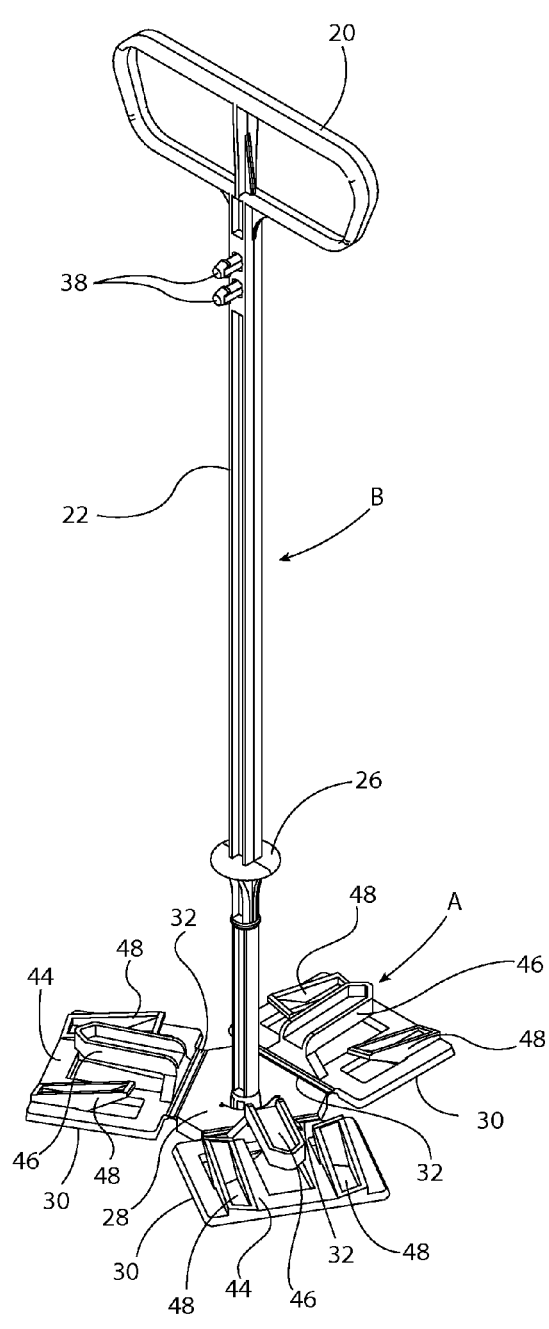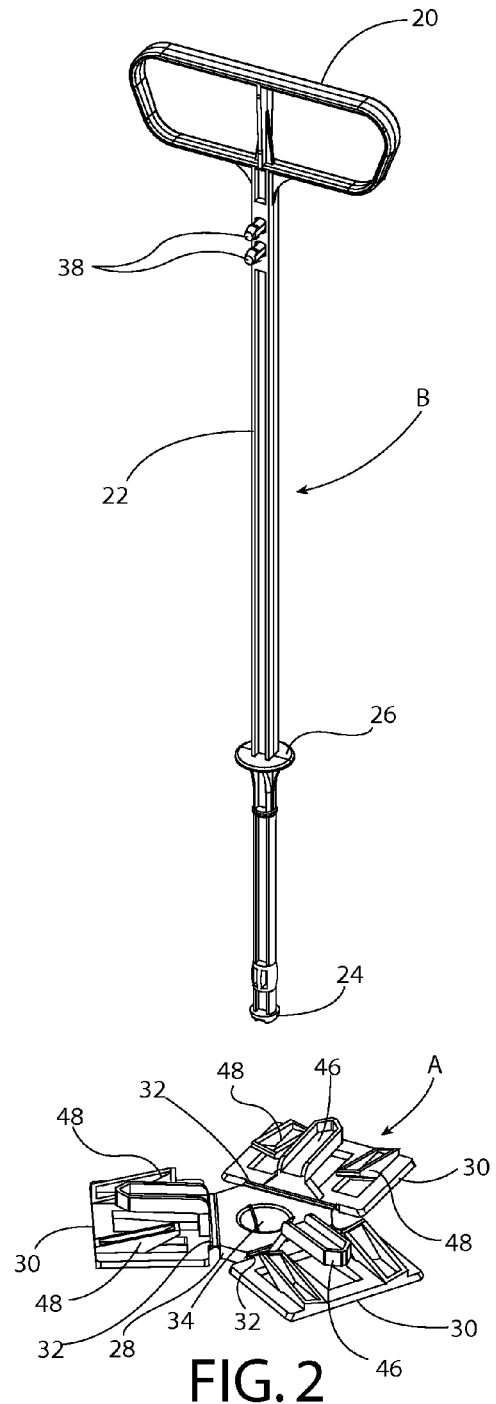
FIG. 1
FIG. 2

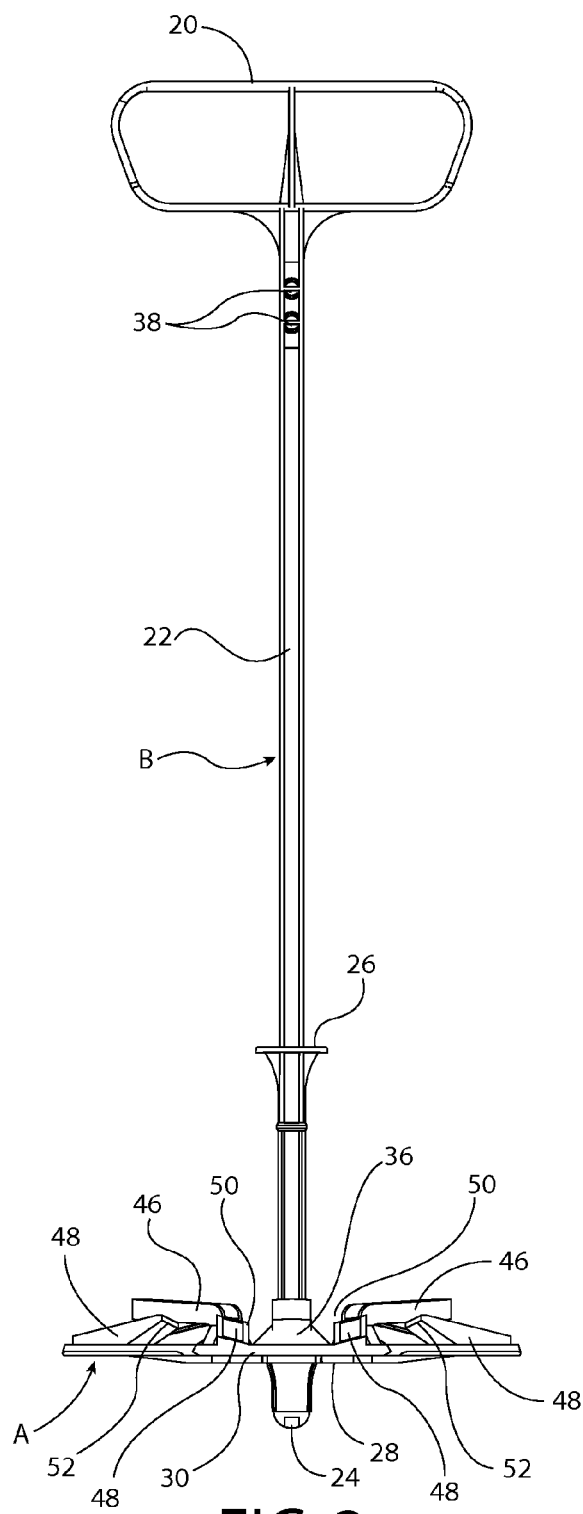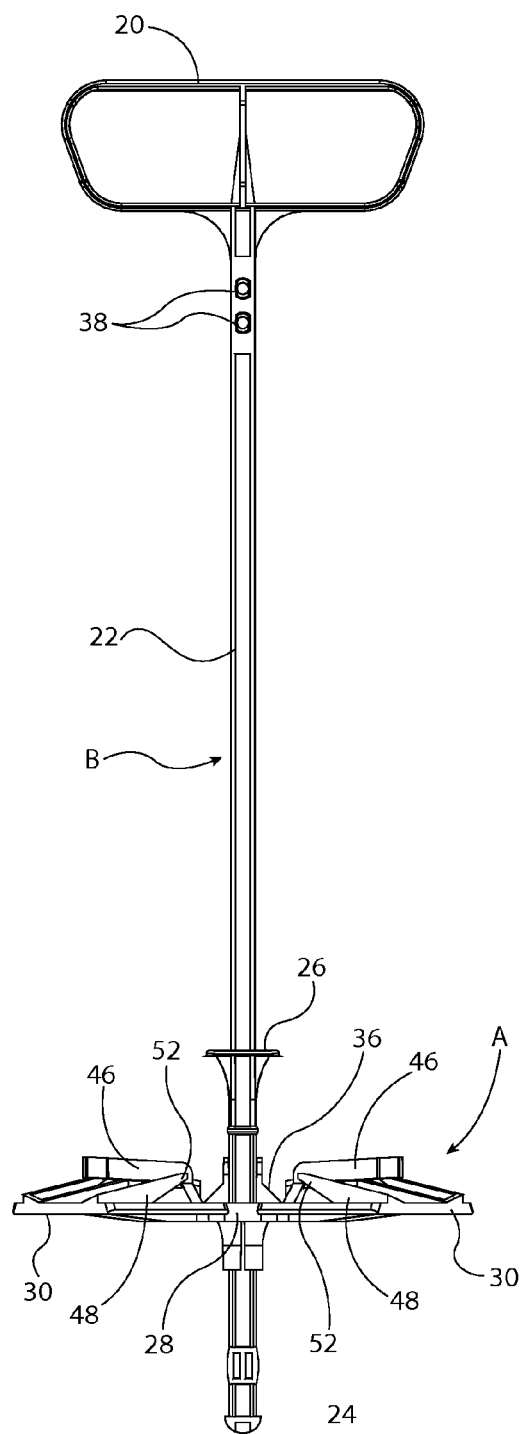

CONNECTOR FOR MULTIPLE POTTED PLANTS

CROSS-REFERENCE TO RELATED APPLICATIONS

Priority is claimed on Provisional Patent Application No. 61/894,808, filed Oct. 23, 2014, entitled "Plastic Clip, Releasable Cable Tie, and System to Hold Three Pant Pots Securely".

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to the packaging and marketing of potted plants and more particularly to a system for connecting multiple potted plants together for marketing the plants as a group.

2. Description of Prior Art including Information Disclosed under 37 CFR 1.97 and 1.98

Plants are often grown in individual pots rather than in trays. These pots are transported from the grower to the retailer on rolling racks. Each rack consists of four to six trays on which the plants are shipped. Recently, retailers and growers have decided that plant sales could be increased if several different plants that thrive under similar conditions are marketed together and sold as a unit. For example, if three different plants that thrive in shade, are deer resistant or attract butterflies are sold as a unit overall sales of these plants increase.

Retailers often want to ensure that these plants packaged as a group stay connected in a manner that prevents consumers from easily breaking up the group by interchanging plants.

It is desirable that the plants be shipped from the grower to the retailer in a manner that makes the plants ready to display to potential customers. The plants should be packaged for easy transport by the customer from the display point to the cash register of the retailer for purchase and then to travel home. Accordingly, the package should include an easily accessible handle to carry the grouped plants.

It is important that the group of plants be identified by a tag or sign on the group that provides information about the characteristics of the plants in the group. When displayed the tag should be visible above the tallest plant in the group so that it is easy for the consumer to identify the characteristics of the plants. The tag should be secured in a manner such that it will remain in place and does not get blown away even in strong winds when the package is left outside. The tag should be secured to the upper portion of a long handle extending above the grouped plants so that the tag is as visible as possible.

There is an inherent conflict between the growers and the retailers. The growers want the handle as short as possible so that they can fit more trays on each rack and lower shipping costs. The retailer wants the handle as long as possible so that the consumer can easily see the contents of each group.

It is therefore a prime object of the present invention to provide a connector for multiple potted plants.

It is another object of the present invention to provide a connector for multiple potted plants which have common characteristics such that they can be marketed as a group.

It is another object of the present invention to provide a connector for multiple potted plants that will ensure that the plants in the group remain connected together.

It is another object of the present invention to provide a connector for multiple potted plants that will prevent consumers from easily breaking up the group by interchanging plants.

It is another object of the present invention to provide a connector for multiple potted plants that arranges the plants for ready display to potential customers.

It is another object of the present invention to provide a connector for multiple potted plants that maintains the plants for easy transport by the customer to the cash register of the retailer for purchase and to travel home.

It is another object of the present invention to provide a connector for multiple potted plants that cooperates with an easily accessible handle to facilitate carrying the grouped plants.

It is another object of the present invention to provide a connector for multiple potted plants for use with a tag for identifying and providing information about the characteristics of the plants in the group.

It is another object of the present invention to provide a connector for multiple potted plants for use with a tag which can be secured such it will remain in place in strong winds when the package is situated outdoors.

It is another object of the present invention to provide a connector for multiple potted plants for use with a handle which can extend above the grouped plants such that the tag is readily visible to a consumer.

It is another object of the present invention to provide a connector for multiple potted plants for use with a handle which can be retracted for shipping.

It is another object of the present invention to provide a connector for multiple potted plants which can be used in conjunction with a handle which can be adjusted to a lower height for shipment by the grower and to a higher height for display of the plants.

It is another object of the present invention to provide a connector for multiple potted plants which can reduce shipping costs.

BRIEF SUMMARY OF THE INVENTION

In general, the above mentioned objects are achieved by the present invention which is directed to a connector for two or more plant pots of the type having a wall with an outwardly extending lip proximate the rim. The connector includes a base and two or more pot engaging parts connected to and extending from the base. Each of the engaging parts includes a surface adapted to face the wall of a pot, a first engaging member extending in a first direction in a plane substantially parallel to, but spaced from, the engaging part surface, and at least one second engaging member extending from the engaging part surface at a location spaced from the first engaging member in a direction substantially opposite to the first direction. The wall of a pot may be situated between the first engaging member and the second engaging member. The second engaging member has a pot wall contact surface. The contact surface is inclined toward the first engaging member. The second engaging member has an unattached end. The unattached end is spaced away from the wall engaging surface and is adapted to engage the lip of the pot.

The engaging part preferably includes two second engaging members. The second engaging members are situated on either side of the first engaging member. Each of the second engaging members has an unattached end spaced from the surface of the engaging part which is adapted to engage the lip of the pot.

The base of the connector has an opening. A handle is provided for use with the connector. The handle includes means adapted to engage the opening in the base of the connector. The handle is movable relative to the connector. The handle has means for engaging the opening of the base in at least one of two positions relative to the base.

The handle has a gripping portion and a connector engaging portion. A tag is provided as is means for mounting the tag on the handle.

The connector includes means for pivotally connecting the engaging parts and the base. The pivotally connecting means preferably takes the form of a living hinge.

The base preferably has a substantially triangular shape.

In accordance with another aspect of the present invention, a connector is provided for two or more plant pots of the type having a curved wall. The connector includes a base and two or more pot engaging parts connected to and extending from the base. Each of the engaging parts has a surface adapted to face the wall of a pot engaged by the engaging part, a first engaging member extending in a first direction in a plane substantially parallel to, but spaced from, the surface, and two second engaging members extending from the surface in a direction substantially opposite to the first direction. The second engaging members are spaced from the first engaging member such that the wall of a pot may be situated between the first engaging member, on the one hand, and the two second engaging members, on the other hand. The second engaging members each have a pot wall contact portion. The contact portion of each of the second engaging members is inclined toward the first engaging member.

The contact portions of the second engaging members are inclined in a direction and to an extent which substantially matches the curvature of a pot wall.

The pot wall has a lip extending outwardly from the wall proximate the rim of the pot. Each of the second engaging members has an unattached end spaced from the surface of the engaging part adapted to engage the lip of the pot.

The base of the connector has an opening. A handle is provided for use with the connector. The handle has means adapted to engage the opening in the base of the connector. Preferably, the handle has means for engaging the opening of the base in at least one of two different positions relative to the base.

BRIEF DESCRIPTION OF THE SEVERAL VIEWS OF DRAWINGS

To these and to such other objects that may hereinafter appears, the present invention relates to a connector for multiple potted plants as described in detail in the following specification and recited in the annexed claims, taken together with the accompanying drawings, in which like numerals refer to like parts and in which:

FIG. 1 is a perspective view of the connector and handle, showing the handle engaging the connector in its extended position;

FIG. 2 is a view similar to that of FIG. 1 but showing the handle prior to engaging the connector;

FIG. 3 is front elevation view of the connector and handle, with the handle in the extended position;

FIG. 4 is a rear elevation view of the connector and handle, with the handle in the retracted position;

DETAILED DESCRIPTION OF THE INVENTION

Figure 5:
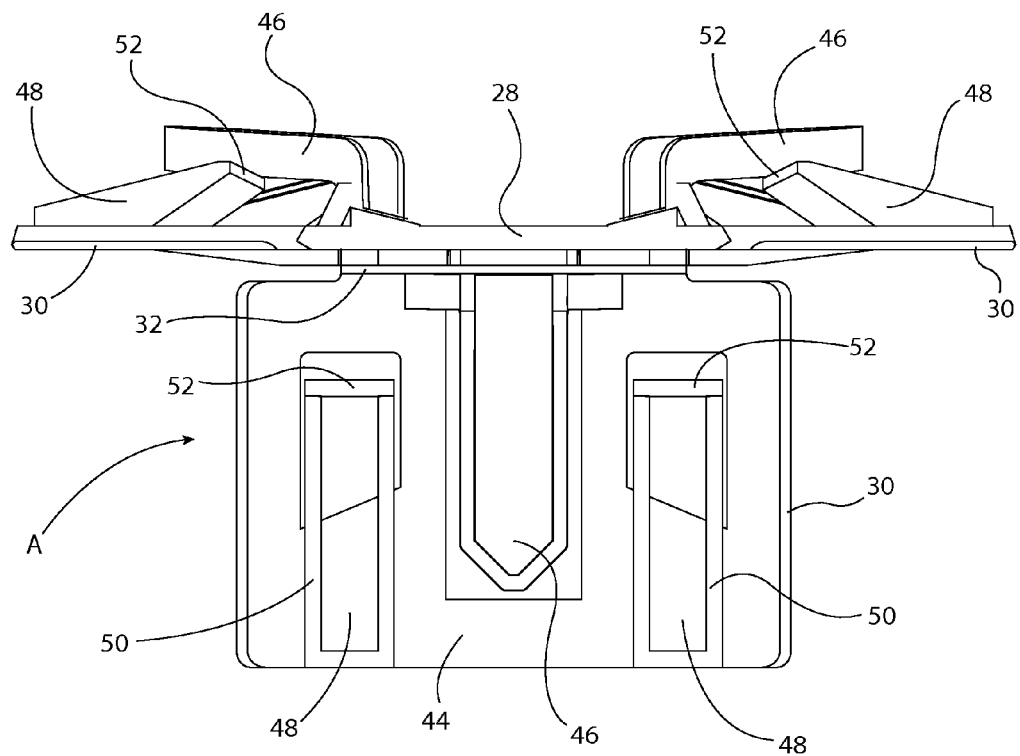
FIG. 5 is an enlarged front elevation view of the connector with one of the engaging parts folding into the pot engaging position.

As seen in the figures, the present invention relates to a connector, generally designated A, designed to connect multiple pots 10 suitable for retaining plants 12. Pots 10 are formed of plastic material and include a curved wall 14 with an outwardly extending lip 16 proximate the open top 18 thereof.

Connector A is adapted for use with a handle, generally designated B. Handle B includes a gripping part 20 and an elongated connector engaging part 22. As best seen in FIG. 2, the lower end of portion 22 of the handle includes an end part 24. Spaced above end part 24 along portion 22 is a radially outwardly extending stop part 26.

Connector A is preferably made of plastic and includes a base 28 having three edges. Three pot wall engaging parts 30 are provided. Each of the engaging parts 30 is pivotally attached to a different one of the three edges of the base by a living hinge 32. Accordingly, the engaging parts can be pivoted relative to the plane of base 28 between a position substantially within the plane of base 24, as seen in FIGS. 1-4, 6 and 7, to a position substantially perpendicular to the plane of base 28, as shown in FIGS. 5, 8, 9, 10A and 10B, in which the wall of a pot can be engaged.

Base 28 has a central opening 34. Extending above and below the surface of base 28, in registration with opening 34, is a funnel-like neck 36 which has a central opening through which portion 22 of handle B is adapted to extend. The opening in neck 36 is sized to frictionally engage portion 22 of the handle between end 24 and part 26 such that the handle can move relative to base 28 between an extended position, as shown in FIG. 3, and a retracted position, wherein neck 36 engages stop 26. Neck 36 also serves to maintain the handle in an upright position, perpendicular to the surface of the base.

End 24 of the handle is formed of resilient material such that it can be compressed to be inserted through opening 34 in neck 36 of base 28. When fully inserted through the opening, the end will expand so as to lodge under neck 36. In that position, see FIG. 3, the end of the handle cannot be pulled back through the opening. In this manner, once the handle end is seated in the base, the handle is secured to the base, and the base and engaged pots may be lifted by the handle.

However, the handle can be pushed downward, toward the base, as seen in FIG. 4, up to a distance determined by the location of stop 26. Because part 36 frictionally engages the handle between that part and stop 26, the handle will maintain its vertical position relative to the base wherever it is placed. Accordingly, the handle can be placed in the retracted position for shipping and moved to the extended position wherein it can be easily gripped and can better display a tag 40.

The position at which stop 26 is fixed along the length of the handle is selected when the handle is manufactured. That position will determine the degree to which the handle can be retracted such that pots of different heights can be accommodated.

Aside from cooperating with the end part 24 of the handle, neck 36 also serves to maintain the handle in an upright position, perpendicular to the surface of the base, regardless to the vertical position of the handle.

The upper portion of handle B is provided with spaced protrusions 38 extending from the surface of the handle for securing tag 40 (FIG. 8) to the handle. As seen in the figures, each protrusion is provided with oppositely directed top and bottom detents or "nubs" extending outwardly toward the gripping portion 20 and the base 28, respectively. When the protrusions 38 are received in openings 42 in a tag 40, the edge of each tag opening will pass over the detents extending from ends of the protrusions and lodge behind the detents, so as to securely retain the tag on the handle.

Tag 40 has two vertically aligned openings 42 which have the same size and spacing as protrusions 38. When the handle is in its extend position, a tag attached to protrusions 38 of the handle will be in a position to be easily viewed by a potential purchaser. The tag would contain text and/or images providing information about the plants in the pots attached to the connector, including the nature thereof, the proper care of the plants, planting instructions, etc.

Figure 6:
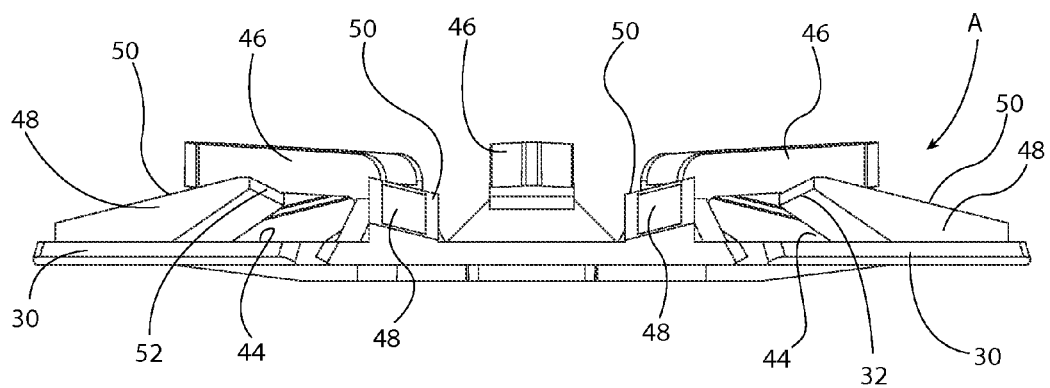
FIG. 6 is an enlarged front elevation view of the connector showing the inclined pot contact surfaces of the second engaging members.
Figure 7:
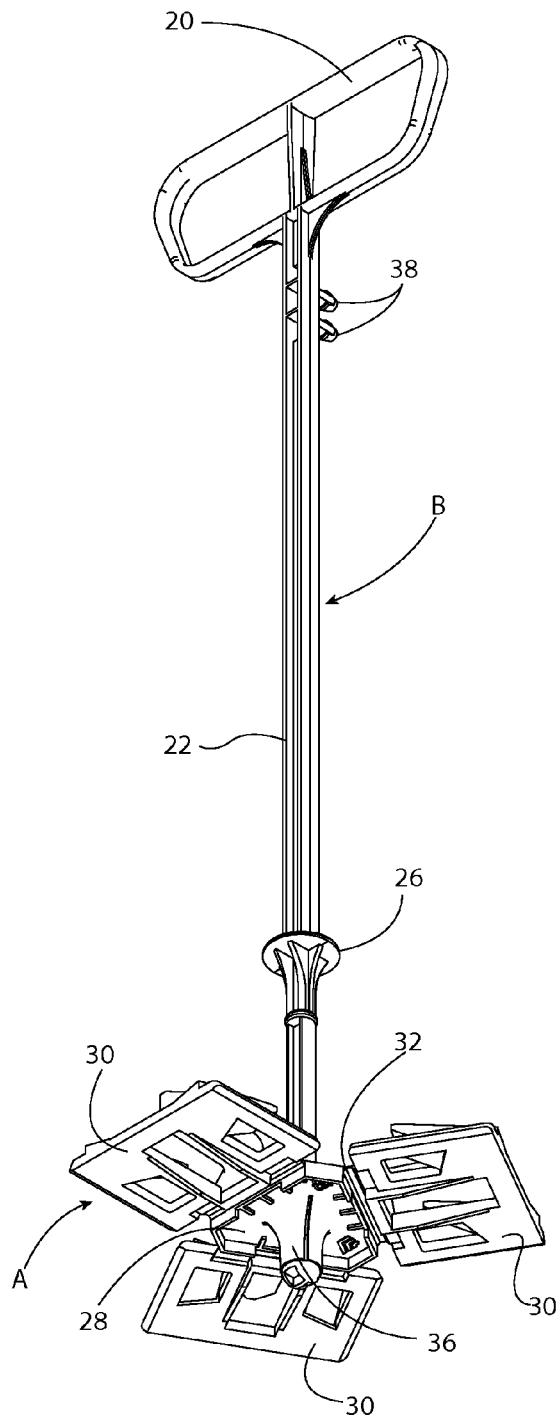
FIG. 7 is a perspective view of the connector and handle showing the connector before the engaging parts are folding into pot engaging positions.
Figure 8:
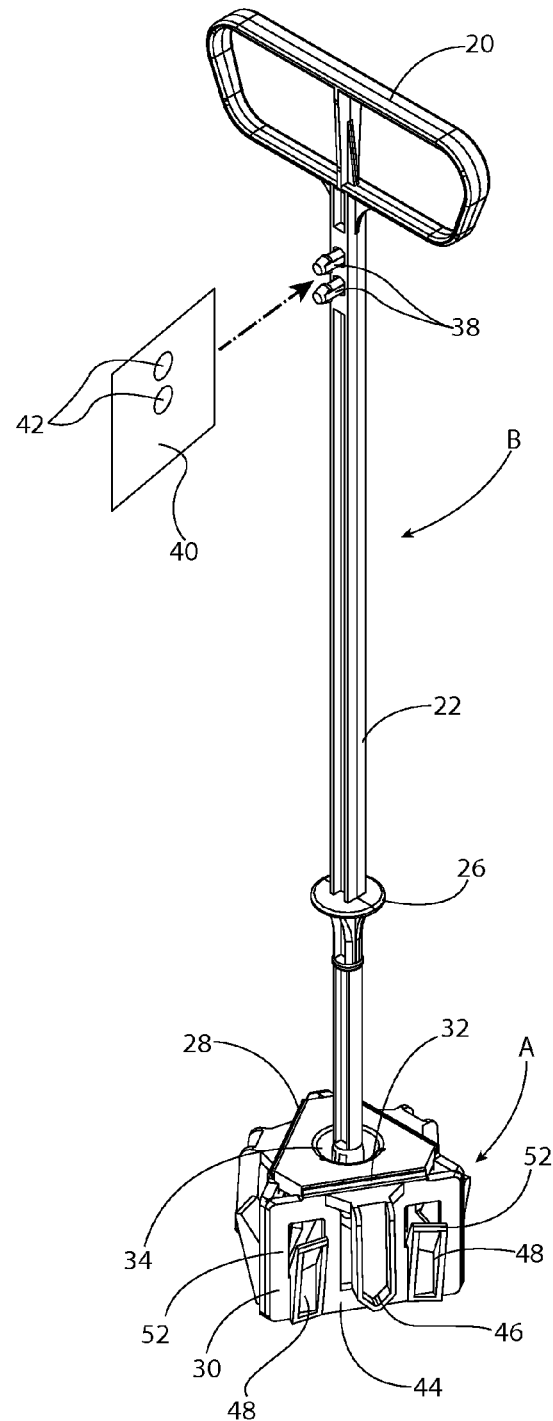
FIG. 8 is a perspective view of the connector and handle showing the connector after the engaging parts are folding into pot engaging positions.
Figures 10A, 10B:
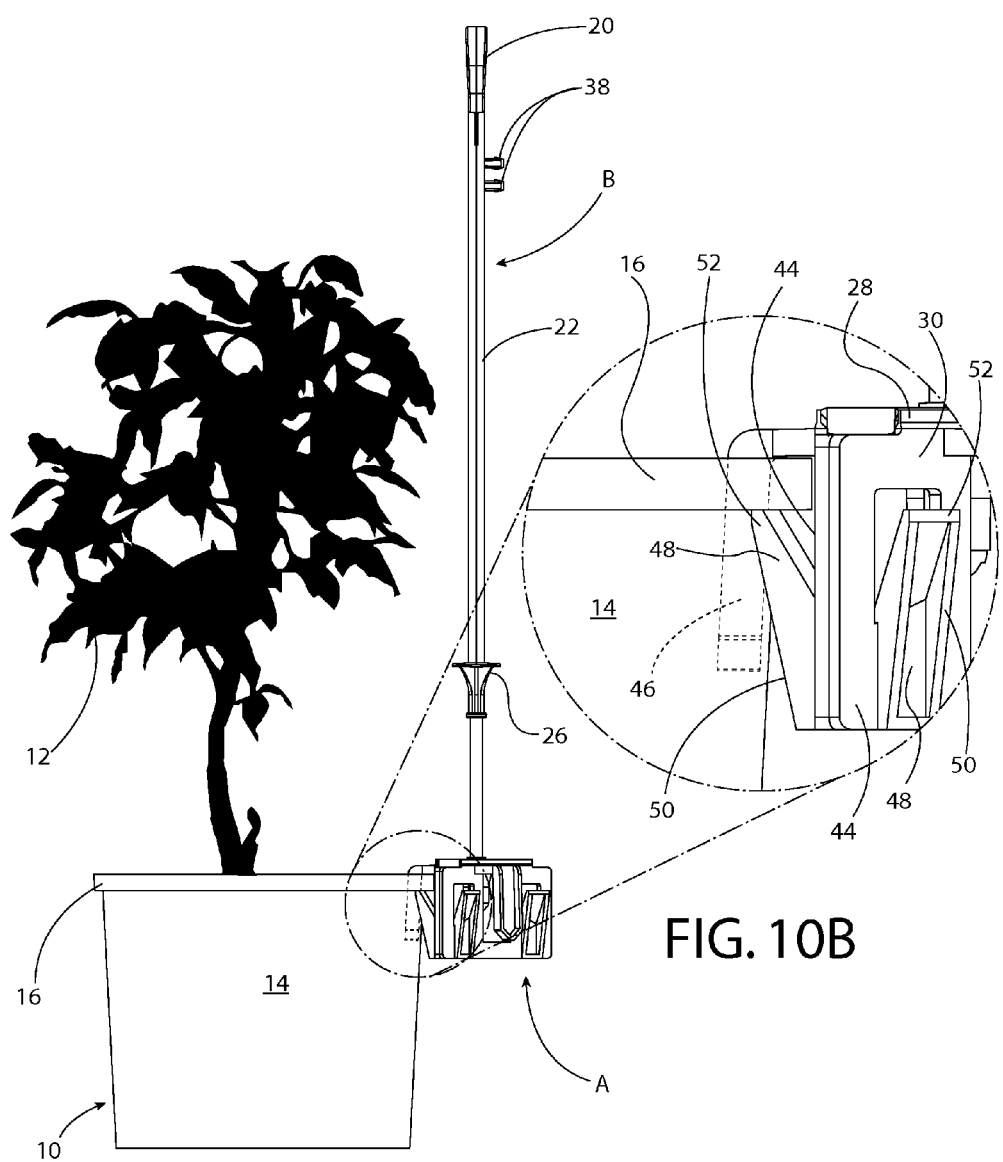
FIG. 10A is a side view of the connector and handle showing the connector engaging a potted plant.
FIG. 10B is an enlarged portion of FIG. 10A showing the details of the engaging members engaging the lip of the pot.

Each of the pot wall engaging parts 30 has a surface 44 adapted to face the wall of a pot, when that wall is engaged by the engaging part 30. As best seen in FIGS. 5, 6 and 10B, a first engaging member 46 is mounted to and extends from the middle of the engaging part in a first direction, away from base 28, in a plane substantially parallel to, but spaced from, surface 44 of the engaging part 30.

Two second engaging members 48 extend from surface 44 of part 30 in a direction substantially opposite to the direction of member 46, that is, toward base 28. The second engaging members 48 are situated on either side of and are spaced from member 46.

Member 46 is spaced from members 48 by a distance substantially equal to the thickness of the pot wall. Accordingly, the pot wall can be received between member 46 and members 48.

As can be seen in the figures, members 46 and 48 are preferably hollow, each being formed of walls that define the member which surround the hollow interior thereof and form the sides of the member. Those side walls of each member 48 have a portion, in the form of an edge 50, which faces and contacts the pot wall when the pot wall is received between member 46 and members 48.

As best seen in FIG. 6, the contact edge portion 50 of each of the members 48 is inclined toward member 46, when viewed from the end of the member. Further, as seen in FIG. 10B, the contact edge portion 50 of each of the members 48 is also inclined away from the surface of the engaging part such that the unattached end 52 of the member 48 is spaced from surface 44. In this manner, the contact edge portions 50 of members 48 are inclined in a direction and to an extent which substantially matches the curvature and pot wall 14. This permits the members 48 to maintain good contact with the pot wall even though the pot wall is curved.

Figure 9:
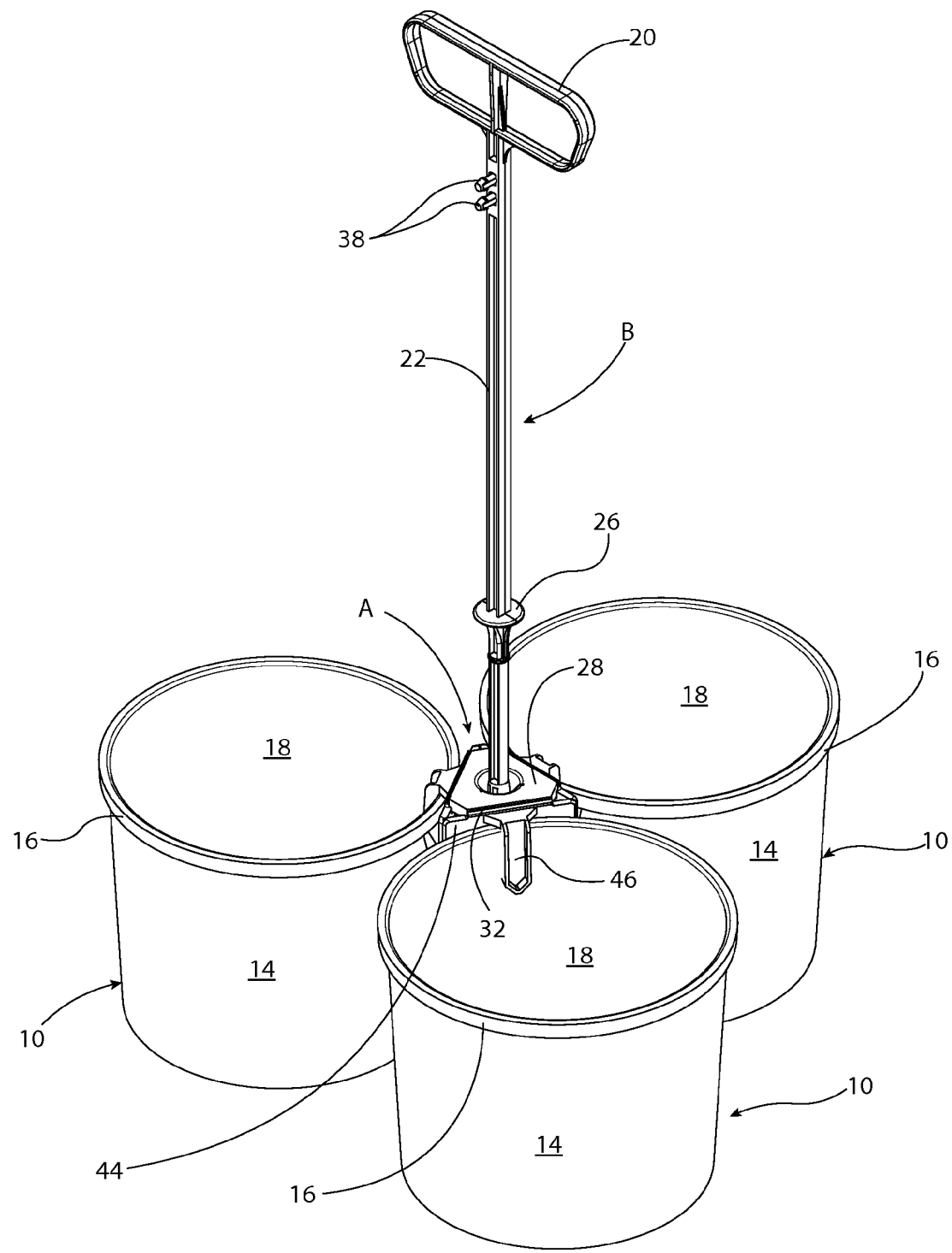
FIG. 9 is a perspective view of the connector and handle with the connector engaging three plant pots.

As best seen in FIG. 10B, when the engaging parts 30 are each folded into their engaging position, and the pot wall of each pot is fully received between member 46 and members 48 of each engaging part, the unattached end 52 of each member 48 will engage lip 16 of the pot, as seen in FIG. 9. More particularly, ends 52 of each pair of members 48 of each engaging part will lodge under the lip such that the three pots are securely engaged by the connector and the pots cannot easily become detached, either accidentally or intentionally.

It will now be appreciated that the present invention relates to a connector for two or more plant pots of the type having a curved wall. The connector includes a base and two or more pot engaging parts connected to and extending from the base. Each of the engaging parts has a surface adapted to face the wall of a pot engaged by that engaging part, a first engaging member extending in a first direction in a plane substantially parallel to, but spaced from, the engaging part surface, and two second engaging members extending from the engaging part surface in a direction substantially opposite to the direction of the first engaging member. The second engaging members are spaced from the first engaging member such that the wall of a pot may be situated between the first engaging member, on the one hand, and the two second engaging members, on the other hand. The second engaging members each have a pot wall contact portion. The contact portion of each of the second engaging members is inclined toward the first engaging member. Further, the second engaging members each have an unattached end designed to lodge under the lip of the pot.

In addition to being inclined toward the first engaging member, the contact surfaces of the second engaging members are at the same time inclined away from the surface of the engaging part. The contact portions of the second engaging members are inclined in a direction and to an extent which substantially matches the curvature of a pot wall.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims.

In particular, the number of engaging parts and the shape of the base may be altered such that the connector can be reconfigured to connect any number of pots, up to as many as the size of the pots will allow. Further, the engaging members could be made solid instead of hollow and the living hinge connection between the engaging parts and the base could be replaced by a different type of hinge.

We claim:

1. A connector for two or more plant pots of the type having a wall, the connector comprising a base and two or more pot engaging parts connected to and extending from said base, each of said engaging parts comprising a surface adapted to face the wall of a pot, a first engaging member extending in a first direction in a plane substantially parallel to, but spaced from, said surface, and at least one second engaging member situated along side and spaced from said first engaging member and extending from said surface in a direction substantially opposite to said first direction, such that the wall of a pot may be situated between said first engaging member and second engaging member, said second engaging member having a pot wall contact portion inclined toward said first engaging member and an unattached end spaced from said engaging part surface.

2. The connector of claim 1 wherein the pot wall has an outwardly extending lip proximate the rim and said unattached end of said second engaging member is adapted to engage the lip of the pot.

3. A connector for two or more plant pots of the type having a wall, the connector comprising a base and two or more pot engaging parts connected to and extending from said base, each of said engaging parts comprising a surface adapted to face the wall of a pot, a first engaging member extending in a first direction in a plane substantially parallel to, but spaced from, said surface, and at least one second engaging member spaced from said first engaging member and extending from said surface in a direction substantially opposite to said first direction, such that the wall of a pot may be situated between said first engaging member and second engaging member, said second engaging member having a pot wall contact portion inclined toward said first engaging member and an unattached end spaced from said engaging part surface, wherein at least one of said engaging parts comprises two second engaging members, said second engaging members being situated on either side of said first engaging member, and wherein each of said second engaging members has an unattached end spaced from said engaging part surface.

4. A connector for two or more plant pots of the type having a wall, the connector comprising a base and two or more pot engaging parts connected to and extending from said base, each of said engaging parts comprising a surface adapted to face the wall of a pot, a first engaging member extending in a first direction in a plane substantially parallel to, but spaced from, said surface, and at least one second engaging member spaced from said first engaging member and extending from said surface in a direction substantially opposite to said first direction, such that the wall of a pot may be situated between said first engaging member and second engaging member, said second engaging member having a pot wall contact portion inclined toward said first engaging member and an unattached end spaced from said engaging part surface, further comprising an opening in said base and a handle, said handle comprising means adapted to engage said opening in said base.

5. The connector of claim 4 wherein said handle comprises means for engaging said opening of said base in one of two positions relative to said base.

6. The connector of claim 4 wherein said handle comprises a gripping portion and a connector engaging section.

7. The connector of claim 4 further comprising a tag and means on said handle for securing said tag.

8. A connector for two or more plant pots of the type having a wall, the connector comprising a base and two or more pot engaging parts connected to and extending from said base, each of said engaging parts comprising a surface adapted to face the wall of a pot, a first engaging member extending in a first direction in a plane substantially parallel to, but spaced from, said surface, and at least one second engaging member spaced from said first engaging member and extending from said surface in a direction substantially opposite to said first direction, such that the wall of a pot may be situated between said first engaging member and second engaging member, said second engaging member having a pot wall contact portion inclined toward said first engaging member and an unattached end spaced from said engaging part surface, further comprising means for pivotally connecting said engaging parts and said base.

9. The connector of claim 8 wherein said pivotally connecting means comprises a living hinge.

10. A connector for two or more plant pots of the type having a wall, the connector comprising a base and two or more pot engaging parts connected to and extending from said base, each of said engaging parts comprising a surface adapted to face the wall of a pot, a first engaging member extending in a first direction in a plane substantially parallel to, but spaced from, said surface, and at least one second engaging member spaced from said first engaging member and extending from said surface in a direction substantially opposite to said first direction, such that the wall of a pot may be situated between said first engaging member and second engaging member, said second engaging member having a pot wall contact portion inclined toward said first engaging member and an unattached end spaced from said engaging part surface, wherein said base has a substantially triangular shape.

11. A connector for two or more plant pots of the type having a wall, the connector comprising a base and two or more pot engaging parts connected to and extending from said base, each of said engaging parts comprising a surface adapted to face the wall of a pot, a first engaging member extending in a first direction in a plane substantially parallel to, but spaced from, said surface, and two second engaging members spaced from said first engaging member, extending from said surface in a direction substantially opposite to said first direction, such that the wall of a pot may be situated between said first engaging member, on the one hand, and said two second engaging members, on the other hand, each of said two second engaging members having a pot wall contact portion inclined toward said first engaging part.

12. The connector of claim 11 wherein said pot wall has a lip extending outwardly from the wall proximate the rim, wherein each of said second engaging members has an unattached end spaced from said engaging part surface.

13. The connector of claim 12 wherein each of said unattached ends of said second engaging members is adapted to lodge under the lid of the pot.

14. The connector of claim 11 further comprising an opening in said base and a handle, said handle comprising means adapted to engage said opening in said base.

15. The connector of claim 14 wherein said handle comprises means for engaging said opening of said base in one of two positions relative to said base.

16. The connector of claim 14 wherein said handle comprises a gripping portion and a connector engaging section.

17. The connector of claim 14 further comprising a tag and means for attaching said tag to said handle.

18. The connector claim 11 further comprising means for pivotally connecting said engaging parts and said base.

19. The connector of claim 18 wherein said pivotally connecting means comprises a living hinge.

20. The connector of claim 11 wherein said base has a substantially triangular shape.

21. In combination, a connector for two or more plant pots and a handle, the connector comprising a base and two or more pot engaging parts connected to and extending from said base, said base comprising an opening, said handle comprising a gripping portion at one end, a base engaging end and a stop member spaced along said handle from said base engaging end, said base engaging end being formed of a resilient material such that it can be compressed for insertion through said opening and thereafter expands to lodge under said base, said base opening being defined by a neck that frictionally engages the surface of said handle such that said handle may be moved relative to said base at any position between the extended position, wherein said base engaging end of said handle is proximate said neck and an extended position wherein said stop member is proximate said neck.

* * * * *